US012767493B2

(12) United States Patent
Delima et al.

(10) Patent No.: US 12,767,493 B2
(45) Date of Patent: Oct. 20, 2026

(54) MITIGATING OSCILLATION OF A LIFT CABLE ON A CRANE

(71) Applicant: International Business Machines Corporation, Armonk, NY (US)

(72) Inventors: Neil Delima, Scarborough (CA); Randy A. Rendahl, Raleigh, NC (US); Sarbajit Kumar Rakshit, Kolkata (IN); Carolina Garcia Delgado, Zapopan (MX)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 18/800,346

(22) Filed: Aug. 12, 2024

(65) Prior Publication Data

US 2026/0042643 A1 Feb. 12, 2026

(51) Int. Cl.
*B66C 13/06* (2006.01)

(52) U.S. Cl.
CPC ...... *B66C 13/063* (2013.01); *B66C 2700/082* (2013.01)

(58) Field of Classification Search
None
See application file for complete search history.

(56) References Cited

U.S. PATENT DOCUMENTS 6,010,018 A 1/2000 Pech
6,102,373 A 8/2000 Amsinger
9,223,008 B1 12/2015 Hartman et al.
2007/0050115 A1* 3/2007 Discenzo ................ B66C 13/22 701/50
2013/0245815 A1* 9/2013 Schneider ............. B66C 13/063 700/228

(Continued)

FOREIGN PATENT DOCUMENTS

CN 216863449 U 7/2022
CN 117828867 A 4/2024

(Continued)

OTHER PUBLICATIONS

Sarkisov et al., Hierarchical Whole-body Control of the cable-Suspended Aerial Manipulator endowed with Winch-based Actuation, 2023 IEEE International Conference on Robotics and Automation (ICRA 2023) May 29-Jun. 2, 2023. London, UK (Year: 2023).*

(Continued)

*Primary Examiner* — Amelia Vorce
(74) *Attorney, Agent, or Firm* — Cantor Colburn LLP; Stephen Yoder

(57) ABSTRACT

Computer-implemented methods for mitigating oscillation of a lift cable on a crane are provided. Aspects include obtaining characteristics of a load affixed to the lift cable via a hook, wind conditions in a location of the lift cable, and operational characteristics of the crane. Aspects also include calculating an estimated oscillation of the load based on a simulation of the crane lifting the load in the wind conditions and the operational characteristics of the crane, calculating a counter force to be applied to the lift cable via the hook, wherein the counter force will reduce the oscillation of the lift cable, and instructing a propulsion system affixed to the hook to apply the counter force to the hook.

20 Claims, 7 Drawing Sheets

(56) References Cited

U.S. PATENT DOCUMENTS

| | | | | |
|---|---|---|---|---|
| 2019/0375615 | A1* | 12/2019 | Markwell | B66C 1/10 |
| 2020/0148510 | A1 | 5/2020 | Rauscher et al. | |
| 2020/0180763 | A1* | 6/2020 | Schütz | B64U 30/20 |
| 2020/0399069 | A1 | 12/2020 | Kirchner | |
| 2021/0078837 | A1* | 3/2021 | Sikora | F04D 27/004 |
| 2021/0107774 | A1* | 4/2021 | Bock | B66C 13/063 |
| 2021/0206605 | A1* | 7/2021 | Rotem | B66C 13/063 |
| 2022/0017335 | A1* | 1/2022 | Sikora | B64D 1/22 |
| 2022/0185635 | A1* | 6/2022 | Haarhoff | B66C 13/08 |
| 2022/0411234 | A1* | 12/2022 | Vihonen | B66C 13/063 |
| 2023/0084439 | A1* | 3/2023 | Oshima | B64D 1/22 244/17.23 |
| 2025/0136417 | A1* | 5/2025 | Mosolf | B66C 13/06 |
| 2025/0214811 | A1* | 7/2025 | Okubo | B66C 13/30 |
| 2025/0353708 | A1* | 11/2025 | Sikora | B66C 13/06 |

FOREIGN PATENT DOCUMENTS

| | | | | |
|---|---|---|---|---|
| DE | 102021109892 A1 * | 10/2022 | | B66C 1/101 |
| LU | 501213 B1 | 7/2022 | | |

OTHER PUBLICATIONS

Anonymous, “The pendulum”, URL: http://labman.phys.utk.edu/phys135core/modules/m9/The%20pendulum.html, Retrieved: Aug. 12, 2024, 4 pages.

Anonymous, “U12 II—U Series—T-MOTOR The Safer Propulsion System,” URL: https://uav-en.tmotor.com/html/2018/u_1021/174.html, Retrieved: Aug. 12, 2024, 4 pages.

Anonymous, “When should you stop a crane due to strong wind speed?”, URL: https://www.windcrane.com/blog/construction/when-should-you-stop-crane-due-strong-wind-speed, Retrieved: Aug. 12, 2024, 5 pages.

Anonymous, “How Does a Kite Fly? A Tale of Four Forces”, URL: https://www.my-best-kite.com/how-does-a-kite-fly.html, Retrieved: Jul. 1, 2024, 7 pages.

Anonymous, “Kites: A guide for students”, URL: https://web.archive.org/web/20220707015623 . . . , Retrieved: Jul. 1, 2024, 5 pages.

Anonymous, “Moment of Inertia”, URL: https://www.britannica.com/science/moment-of-inertia, Retrieved: Jul. 1, 2024, 5 pages.

Anonymous, “Physics: How a horizontal air current lifts a kite upwards?”, URL: https://www.quora.com/Physics-How-a-horizontal-air-current-lifts-a-kite-upwards, Retrieved: Jul. 1, 2024, 7 pages.

Anonymous, “Transformative technology solutions for the manufacturing industry”, URL: https://www.ibm.com/industries/manufacturing, Retrieved: Jul. 1, 2024, 6 pages.

Dutta, “Intelligent lift motion planning for autonomous tower cranes in dynamic BIM environments”, Doctoral Thesis, Nanyang Technological University, Singapore, 2022, 220 pages.

Fullman, “What is a Crane Load Chart?”, URL: https://totalequipmenttraining.com/blog/what-is-a-crane-load-chart/, Retrieved: Aug. 12, 2024, 11 pages.

Gupta, “Solution for Swinging Problem of Overhead Cranes”, URL: https://contest.techbriefs.com/2017/entries/machinery-automation-robotics/7714, Retrieved: Jul. 1, 2024, 4 pages.

Mann et al., “Attenuation of Initial Oscillation in Bridge Cranes via Input-Shaping-Based Control Methods”, American Society of Mechanical Engineers, Paper No. DSCC2012-MOVIC2012-8709, Sep. 17, 2013, 10 pages.

Nagel, “How to Calculate & Measure Propeller Thrust”, URL: https://www.tytorobotics.com/blogs/articles/how-to-calculate-propeller-thrust, Retrieved: Aug. 12, 2024, 10 pages.

* cited by examiner

MITIGATING OSCILLATION OF A LIFT CABLE ON A CRANE

BACKGROUND

The present disclosure generally relates to controlling the operations of a crane, and more specifically, to mitigating oscillation of a lift cable on a crane.

In general cranes, such as a tower crane, are used to vertically and horizontally lift and move heavy material, especially around the shipping and construction sites. Cranes provide essential support for the construction process, with human involvement in placing and assembling the heavy materials at the proper locations. However, as the length of a lift cable used to lift a load by the crane increases, the risk that the load may sway, or oscillate, also increases. The risk of increased sway or oscillation of the load can also be impacted by wind flow or by movement, such as acceleration, of the crane. The sway, or oscillation, of the load can make it challenging for human workers to adequately control the placement and movement of the load.

SUMMARY

Embodiments of the present disclosure are directed to computer-implemented methods for mitigating the oscillation of a lift cable on a crane. According to an aspect, a computer-implemented method includes obtaining characteristics of a load affixed to the lift cable via a hook, wind conditions in a location of the lift cable, and operational characteristics of the crane. The method also includes calculating an estimated oscillation of the load based on a simulation of the crane lifting the load in the wind conditions and the operational characteristics of the crane, calculating a counter force to be applied to the lift cable via the hook, wherein the counter force will reduce the oscillation of the lift cable, and instructing a propulsion system affixed to the hook to apply the counter force to the hook.

Embodiments also include computing systems and computer program products for mitigating the oscillation of a lift cable on a crane.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the present disclosure are apparent from the following detailed description taken in conjunction with the accompanying drawings in which:

DETAILED DESCRIPTION

Figure 1:
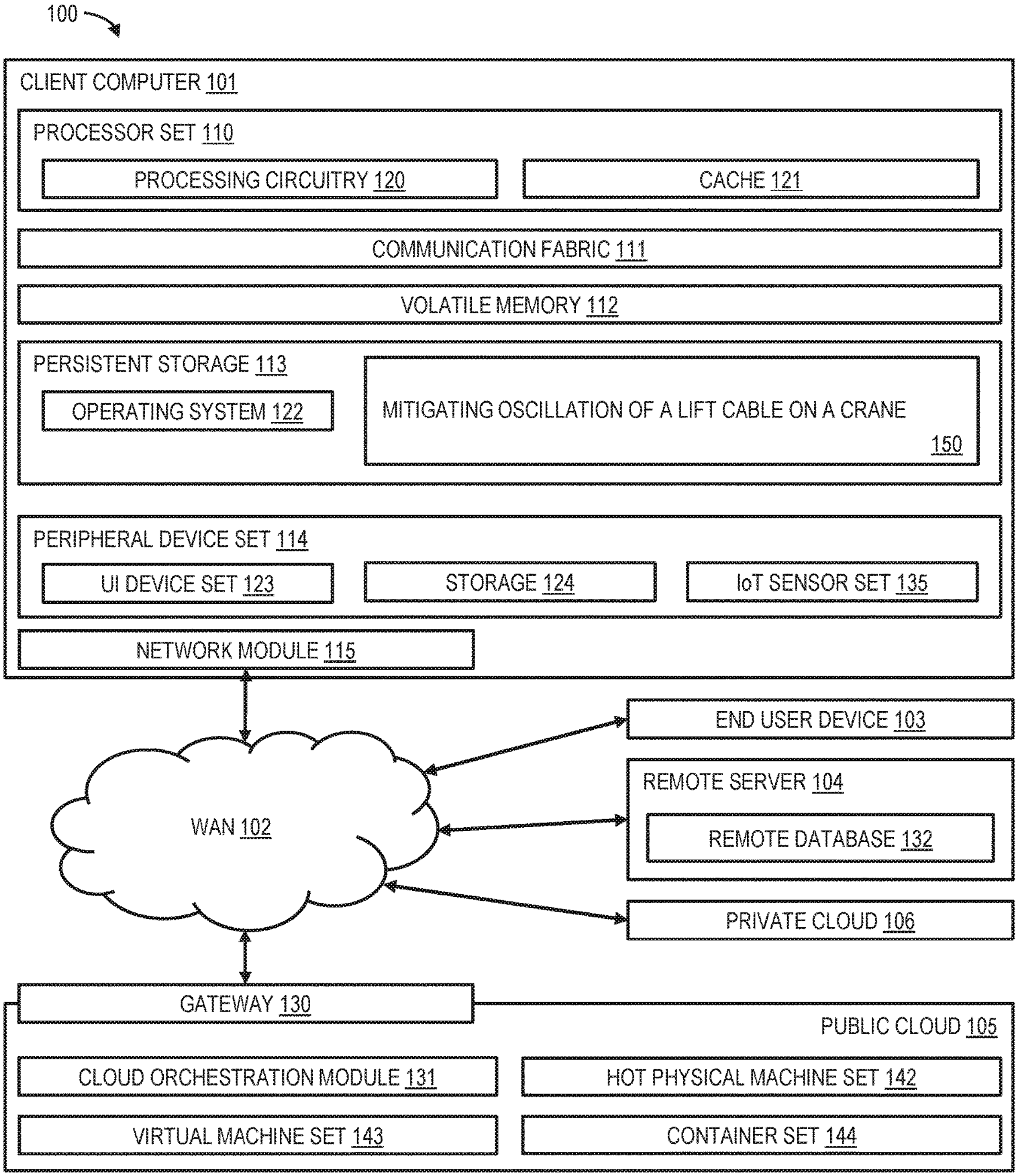
FIG. 1 depicts a block diagram of an example computer system for use in conjunction with one or more embodiments of the present disclosure.

As described above, the sway or oscillation of a load being lifted by a crane can make it challenging for human workers to adequately control the placement and movement of the load. In addition, the sway or oscillation of a load being lifted by a crane can pose safety issues to individuals and structures in the vicinity of the crane. Accordingly, methods and systems for mitigating the oscillation of a lift cable on a crane are needed.

In exemplary embodiments, systems, methods, and computer program products for mitigating the oscillation of a lift cable on a crane are provided. In exemplary embodiments, a crane is configured to lift a load via a hook that is affixed to both the load and to a lift cable of the crane. In exemplary embodiments, the crane includes a processing system that is configured to obtain characteristics of the load (e.g., the weight and dimensions of the load), wind conditions in the vicinity of the crane, and operational characteristics of the crane (e.g., a movement of the crane, a length of the lift cable, and stiffness of the lift cable). The processing system of the crane is also configured to calculate an estimated oscillation of the load based on a simulation of the crane lifting the load in the wind conditions and under the operational characteristics of the crane. The processing system of the crane is further configured to calculate a counter force to be applied to the lift cable via the hook. In exemplary embodiments, the counter force is a vector that includes a magnitude and a direction of a force that will reduce, and potentially eliminate, the oscillation of the lift cable. The processing system of the crane is further configured to instruct a propulsion system affixed to the hook to apply the counter force to the hook.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as mitigating oscillation of a lift cable on a crane as shown at block 150. In addition to block 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 132. Public Cloud 105 includes gateway 130, Cloud orchestration module 131, host physical machine set 142, virtual machine set 143, and container set 144.

COMPUTER 101 may take the form of a desktop computer, laptop computer, tablet computer, smart phone, smart watch or other wearable computer, mainframe computer, quantum computer, a small single board computer (e.g. a Raspberry Pi) or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages the sharing of resources to achieve coherence and economies of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 142, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after the instantiation of the VCE. Cloud orchestration module 131 manages the transfer and storage of images, deploys new instantiations of VCEs, and manages active instantiations of VCE deployments. Gateway 130 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community, or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

Figure 2:
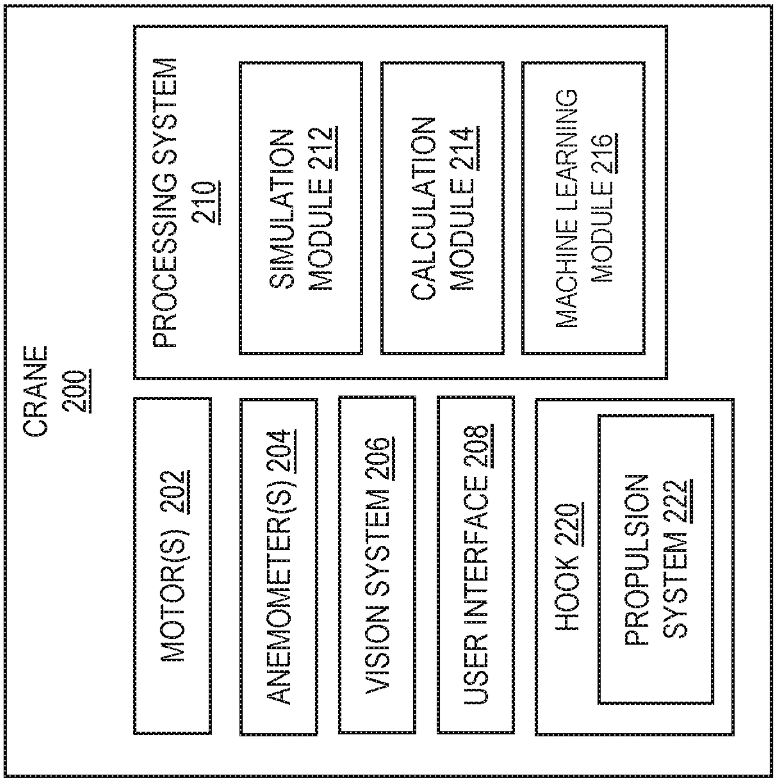
FIG. 2 depicts a block diagram of a crane in accordance with one or more embodiments of the present disclosure.

Referring now to FIG. 2, a block diagram of a crane 200 in accordance with one or more embodiments of the present disclosure is shown. In exemplary embodiments, the crane 200 may be one of a tower crane, mobile crane, an overhead crane or bridge crane, a gantry crane, a telescopic crane, a loader crane, a crawler crane, and a floating crane. In exemplary embodiments, the crane includes a processing system 210 that may be embodied in a computer such as a client computer 101 shown in FIG. 1. The processing system 210 is configured to receive input from an operator via a user interface 208 and to responsively control the operations of the crane 200. For example, the processing system 210 is configured to control the movement of one or more motors 202 that control the movement of one or more of the boom, counterweights, jib, hoist, lifting cable, trolley, and hook 220 to operate the crane 200.

In exemplary embodiments, the crane 200 includes one or more anemometers 204 that are disposed on the crane 200. The anemometers 204 are configured to measure the wind conditions in the vicinity of the crane 200 and to provide the measured wind data to the processing system 210. In exemplary embodiments, the crane 200 also includes a vision system 206 that is configured to monitor the movement of one or more of the hook and a load affixed to the hook. In one embodiment, the vision system 206 includes one or more cameras and may also include a Light Detection and Ranging (LiDAR) system that is configured to monitor the movement of the hook and/or a load affixed to the hook. The vision system 206 is configured to provide the measured movement and location data of the hook or load to the processing system 210.

The crane 200 includes a hook 220 that is configured to be affixed to a load to be lifted by the crane 200. In exemplary embodiments, the hook is connected to the lift cable of the crane 200 and the hook includes a propulsion system 222 that is affixed to the hook 220. The propulsion system 222 is controlled by the processing system 210 and is configured to exert a lateral force (i.e., a force in a direction that is substantially perpendicular to the vertical direction) on the hook 220 to mitigate an oscillation or sway of the hook 220 and attached load.

In exemplary embodiments, the processing system 210 includes a simulation module 212. The simulation module 212 is configured to receive wind data from the anemometers 204, characteristics of a load affixed to a lift cable of the crane 200, and operational characteristics of the crane 200 and to responsively generate an estimated oscillation or sway of the load. In exemplary embodiments, the characteristics of the load include, but are not limited to the weight of the load, the dimensions of the load, and a weight distribution of the load. In exemplary embodiments, the operational characteristics of the crane 200 include the speed and acceleration of the hook of the crane 200, the speed and acceleration of the boom or hoist of the crane 200. In one embodiment, the operational characteristics of the crane 200 are determined by the processing system 210 based on the operator input into the user interface 208. In another embodiment, the operational characteristics of the crane 200 are determined by the processing system 210 based on data received from the vision system 206.

In exemplary embodiments, the oscillation of the load being lifted by the crane can be modeled, for example by the simulation module 212, using a pendulum equation. The equation used is derived from the principles of harmonic motion. Assuming small angular displacements and neglecting damping effects, $\theta''+(g/L)*\theta=0$, where $\theta$ represents the angular displacement of the material from its equilibrium position, $\theta''$ represents the second derivative of $\theta$ with respect to time, which represents the acceleration of the material, g is the acceleration due to gravity, and L is the length of the cable.

In addition the simulation module 212 may use a second-order linear homogeneous differential equation to model the oscillation, $\theta(t)=A*\cos(\omega t+\varphi)$, wherein $\theta(t)$ represents the angular displacement as a function of time, A is the amplitude of the oscillation, which depends on the initial displacement and the energy of the system, $\omega$ is the angular frequency of oscillation, given by $\omega=\sqrt{(g/L)}$, t is the time, and $\varphi$ is the phase constant, which depends on the initial conditions of the system. The solution to this equation represents the oscillatory motion of the load. The amplitude "A" determines the maximum angular displacement of the load, while the angular frequency $\omega$ determines the speed at which the load oscillates. The phase constant $\varphi$ determines the starting point or phase of the oscillation.

In exemplary embodiments, the processing system 210 includes a calculation module 214. The calculation module 214 is configured to calculate a counter force to be applied to the lift cable via the hook. In exemplary embodiments, the counter force is a force that will reduce, or eliminate, the oscillation of the lift cable. The counter force output by the calculation module 214 is a vector that includes a magnitude and a direction. In exemplary embodiments, the calculation module 214 provides the counter force to the processing system 210, which in turn instructs a propulsion system affixed to the hook of the crane 200 to apply the counter force to the hook.

In exemplary embodiments, the counter force to be applied by the propulsion system is calculated by the simulation module 212. In one embodiment, the counter force is calculated by $F=\tau/L$, where $\tau$ is the torque acting on the load and L is the length of the cable. The torque ($\tau$) can be calculated as $\tau=I*\alpha$, where $\alpha$ is the angular acceleration of the load, which can be calculated as $\alpha=-\omega\hat{}2*\theta$, where $\theta$ is the angular displacement and $\omega$ is the angular frequency. The angular frequency ($\omega$) can be calculated as $\omega=2\pi/T$, where T is the period of oscillation of the load. In exemplary embodiments, the moment of inertia (I) depends on the shape and mass distribution of the load and can be calculated as $I=mL\hat{}2$, where m is the mass of the material and L is the length of the cable.

In exemplary embodiments, the processing system 210 includes a machine learning module 216 that can be utilized by the simulation module to generate the estimated oscillation of the load based on the wind conditions, load characteristics, and operational characteristics of the crane. The machine learning module 216 may utilize various machine learning techniques, such as regression or neural networks, to train a predictive model using the collected dataset. The machine learning module 216 is configured to learn the complex relationships between the wind data from the anemometers 204, the characteristics of a load affixed to a lift cable of the crane 200, and the operational characteristics of the crane 200 and the resulting oscillation behavior of the crane.

In exemplary embodiment, after the counter force has been calculated, the processing system is configured to instruct the propulsion system 222 to apply the counter force to the hook 220. In one embodiment, the propulsion system 222 may include multiple propellers affixed to the hook 220 and/or one or more aerial vehicles tethered to the hook 220. The processing system 210 will determine which portions of the propelling system to activate, and at what energy level, based on the counter force and based on the force that each part of the propulsion system 222 can generate.

In exemplary embodiments, the propulsion system 222 will apply counter force, so that the force generated during the amplitude of the material can be controlled gradually. In one embodiment, a sensor installed on the hook 220 is configured to measure the direction of force by measuring the pull force on the lift cable. In another embodiment, the vision system 206 is used to measure a change in the oscillation during the application of the counter force. The processing system 210 is configured to monitor the change in the oscillation during the application of the counter force and continually adjust the operation of the propulsion system 222 to mitigate the oscillation of the hook 220 and the load affixed to the hook 220. Once the amplitude of the load is made stable (i.e., less than a threshold amount) the propulsion system 222 can be deactivated.

Figure 3:
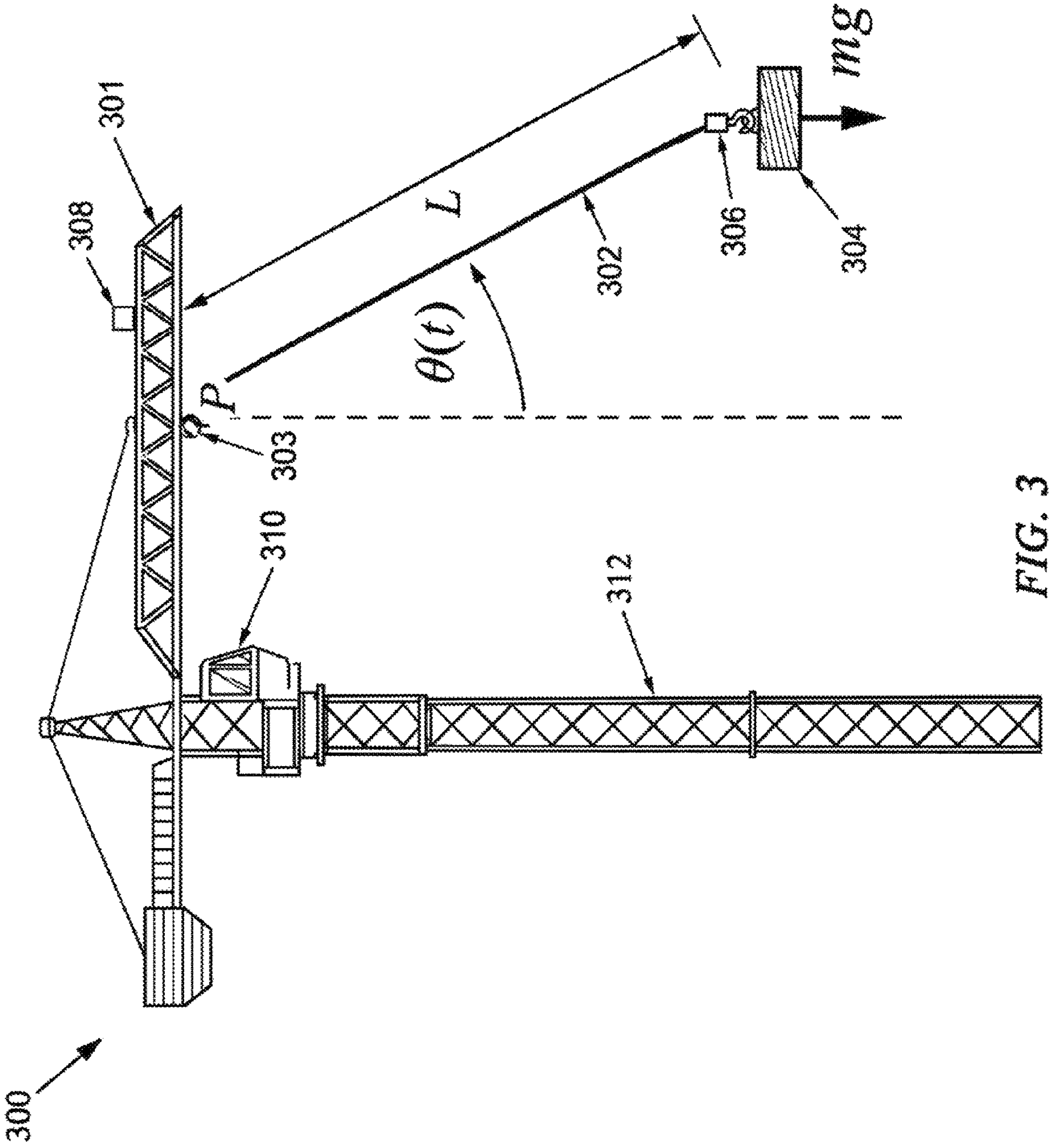
FIG. 3 depicts a schematic diagram of a crane lifting a load via a lift cable in accordance with one or more embodiments of the present disclosure.

Referring now to FIG. 3, a schematic diagram of a crane 300 lifting a load 304 via a lift cable 302 in accordance with one or more embodiments of the present disclosure is shown. As illustrated the crane 300 includes a lift cable 302 that is affixed to a load 304 via a hook 306. The crane 300 also includes an operator station 310 that includes one or more user interfaces that are used to control the movement of boom 301, trolly 303, and a hoist (not shown) that is configured to extend and retract the lift cable 302. In exemplary embodiments, one or more anemometers 308 are disposed on the crane 300 and are configured to monitor wind conditions in the vicinity of the crane 300. In exemplary embodiments, a vision system 312 is disposed on the crane 300 and is configured to monitor the movement of one or more of the hook 306 and the load 304.

Figure 4B:
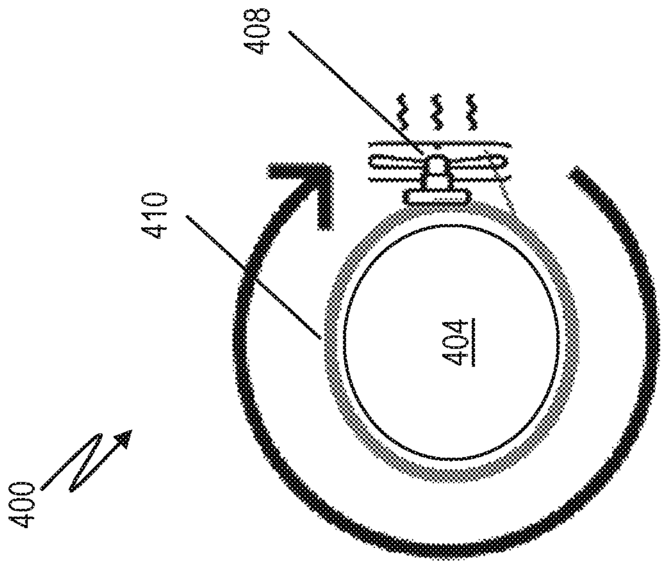
FIGS. 4A and 4B respectively depict a side view and a top view of a hook having a propulsion system in accordance with one or more embodiments of the present disclosure.
Figure 4A:
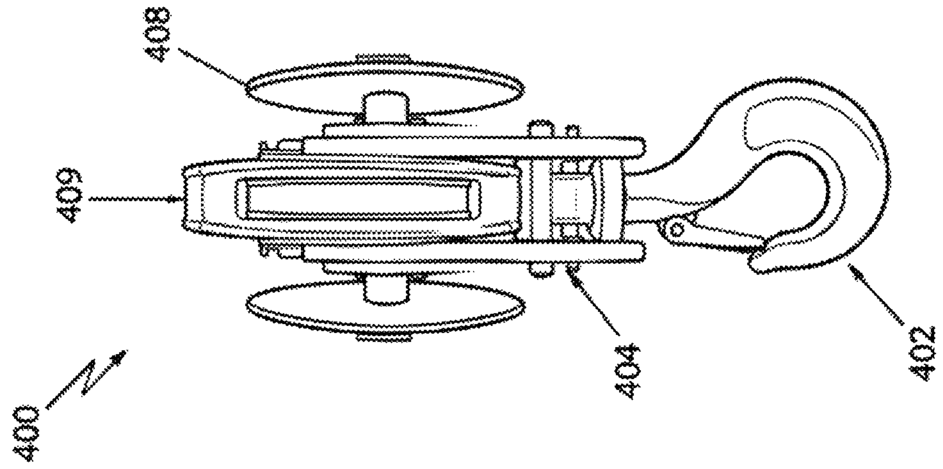

Referring now to FIGS. 4A and 4B, a side view and a top view of a hook 400 having a propulsion system in accordance with one or more embodiments of the present disclosure are respectively shown. As illustrated, the hook 400 includes an attachment member 402 that is configured to affix a load to the hook 400. The hook 400 also includes a body portion 404 that includes wheel 409 that attaches to a lift cable. In exemplary embodiments, one or more propellers 408 are affixed to the body 404 of the hook 400. In exemplary embodiments, the propulsion system includes four propellers that are disposed around the hook 400. Based on the desired magnitude and direction of the counter force, one or more propulsion system will be activated to create the desired counter force.

In one embodiment, the propellers 408 are slidably affixed to the body 404 of the hook 400 via a track 410. In exemplary embodiments, the propellers 408 are configured to slide around the track 410 and to selectively affix to a portion of the track 10. In another embodiment, the propellers are affixed to set locations on the track 410 and the track 410 is configured to rotate about the body 404 of the hook 400 based on input control signals from the processing system. In exemplary embodiments, the operation of the propellers 408 is controlled by the processing system of the crane to exert a force on the hook 420. For example, the processing system can control the location of the propellers 408 along the track 410 and the direction and speed of the rotation of the propellers 408.

Figure 4C:
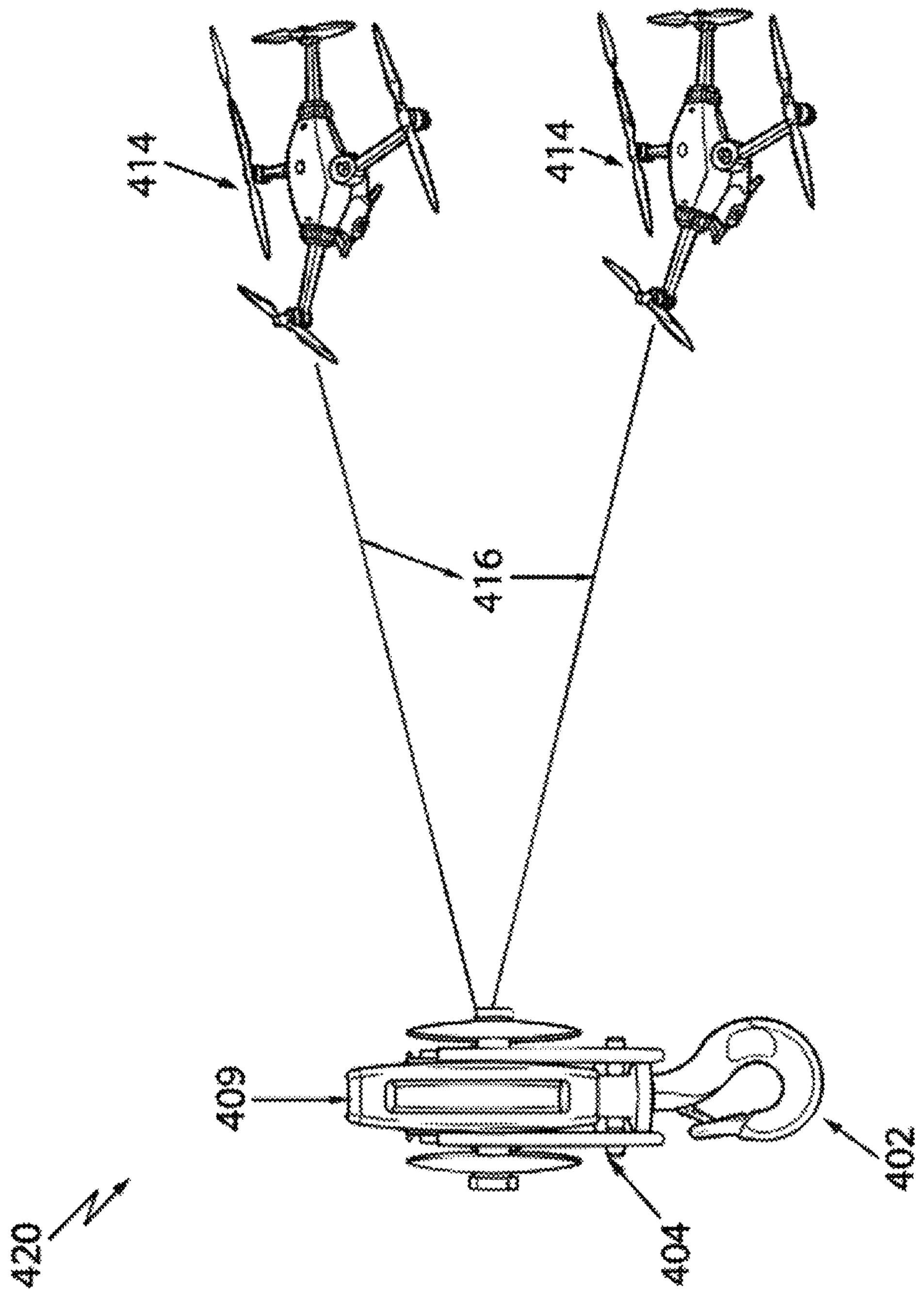
FIG. 4C depicts a side view of a hook having a propulsion system in accordance with one or more embodiments of the present disclosure.

Referring now to FIG. 4C, a side view of a hook 420 having a propulsion system in accordance with one or more embodiments of the present disclosure is shown. As illustrated, the hook 420 includes an attachment member 402 that is configured to affix a load to the hook 420. The hook 420 also includes a body portion 404 that includes wheel 409 that attaches to a lift cable. In exemplary embodiments, one or more aerial vehicles 414 are tethered to the body 404 of the hook 420 via cables 416. In exemplary embodiments, the operation of the one or more one or more aerial vehicles 414 is controlled by the processing system of the crane to exert a force on the hook 420. In exemplary embodiments, the cables 416 may be configured to provide power to the aerial vehicles 414 and/or to facilitate communication between the aerial vehicles 414 and the processing system.

Figure 5:
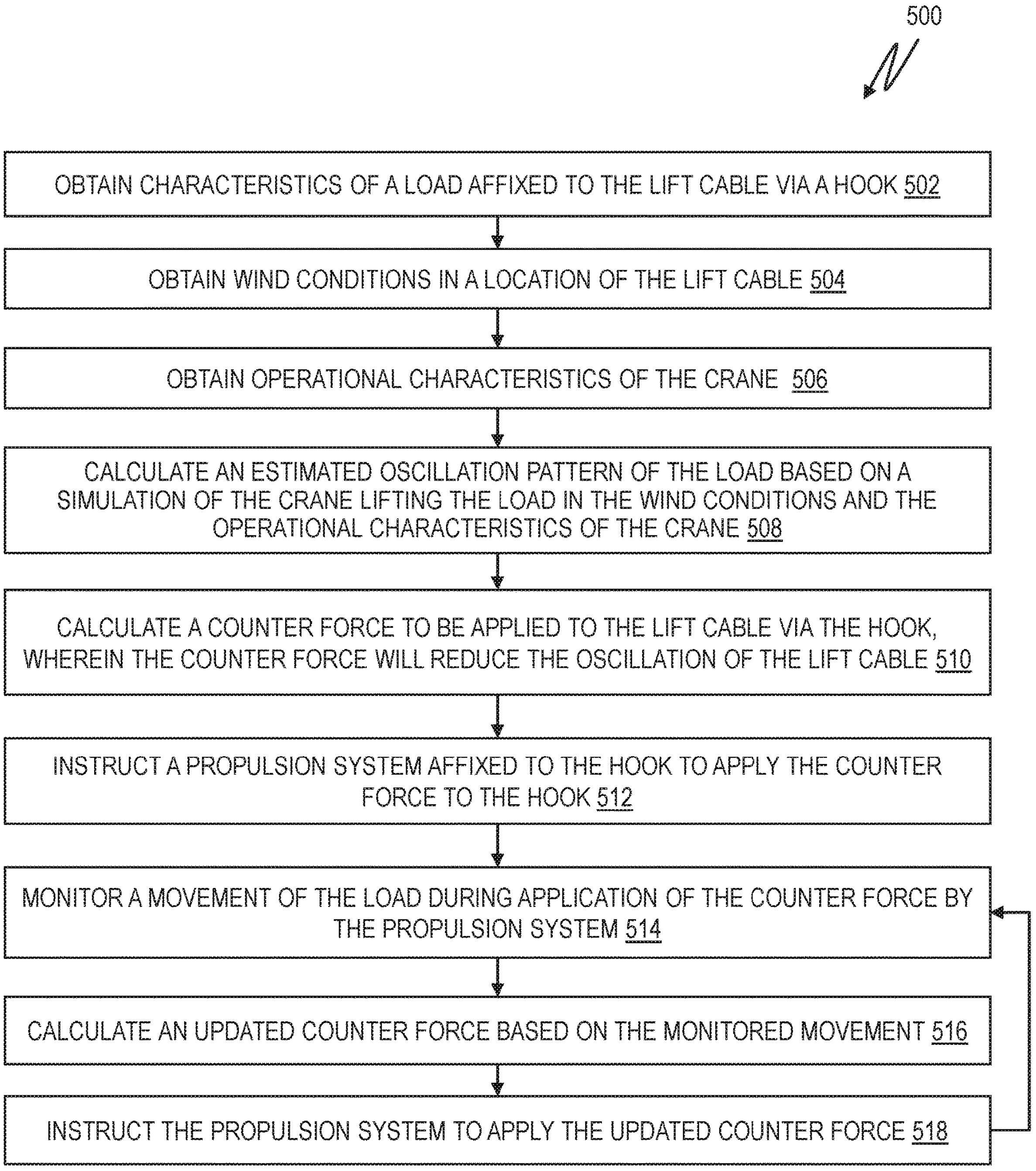
FIG. 5 depicts a flowchart of a method for mitigating the oscillation of a lift cable on a crane in accordance with one or more embodiments of the present disclosure.

Referring now to FIG. 5, a flowchart of a method for mitigating the oscillation of a lift cable on a crane in accordance with one or more embodiments of the present disclosure is shown. In one embodiment, the method 500 is performed by a processing system 210 of a crane 200, such as the one shown in FIG. 2. As shown at block 502, the method 500 includes obtaining characteristics of a load affixed to the lift cable via a hook. In exemplary embodiments, the characteristics of the load include a weight of the load, dimensions of the load, and a weight distribution of the load. Next, as shown at block 504, the method 500 includes obtaining wind conditions in a location of the lift cable. In exemplary embodiments, the wind conditions are obtained via an anemometer disposed on the crane.

As shown at block 506, the method 500 also includes obtaining the operational characteristics of the crane. In exemplary embodiments, the operational characteristics of the crane include the movements of the crane, the length of the lift cable, and the stiffness of the lift cable. Next, as shown at block 508, the method 500 includes calculating an estimated oscillation pattern of the load based on a simulation of the crane lifting the load in the wind conditions and the operational characteristics of the crane. In exemplary embodiments, the estimated oscillation pattern is calculated by a simulation module, such as the simulation module 212 shown in FIG. 2. The method 500 also includes calculating a counter force to be applied to the lift cable via the hook, wherein the counter force will reduce the oscillation of the lift cable, as shown at block 510. In exemplary embodiments, the counter force is a force vector that includes a force magnitude and a force direction. In exemplary embodiments, the counter force is calculated by a calculation module, such as the calculation module 214 shown in FIG. 2.

As shown at block 512, the method 500 also includes instructing a propulsion system affixed to the hook to apply the counter force to the hook. In one embodiment, the propulsion system includes one or more tethered aerial vehicles that are affixed to the hook. In another embodiment, the propulsion system includes one or more propellers affixed to the hook. The one or more propellers may be slidably disposed on a circular track that surrounds the hook and the location of the one or more propellers on the circular track is determined based on the direction of the counter force to be applied.

Next, as shown at block 514, the method 500 includes monitoring the movement of the load during the application of the counter force by the propulsion system. In exemplary embodiments, the movement of the load is monitored by a vision system, such as the vision system 206 shown in FIG. 2. The method 500 also includes calculating an updated counter force based on the monitored movement, as shown at block 516. In exemplary embodiments, the updated counter force may be calculated by one or more of the calculation module and or a machine learning module. The method 500 also includes instructing the propulsion system to apply the updated counter force, as shown at block 518. In exemplary embodiments, the steps shown in block 514 through 518 iteratively repeat until an oscillation of the load is below a threshold value.

One or more embodiments described herein can utilize machine learning techniques to perform tasks, such as mitigating the oscillation of a lift cable on a crane. More specifically, one or more embodiments described herein can incorporate and utilize rule-based decision-making and artificial intelligence (AI) reasoning to accomplish the various operations described herein, namely mitigating the oscillation of a lift cable on a crane. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," and/or "trained machine learning model") can be used for identifying a backup and recovery strategy for a database based on an input service level agreement, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of calculating a counter force for mitigating the oscillation of a lift cable on a crane as described herein.

Figure 6:
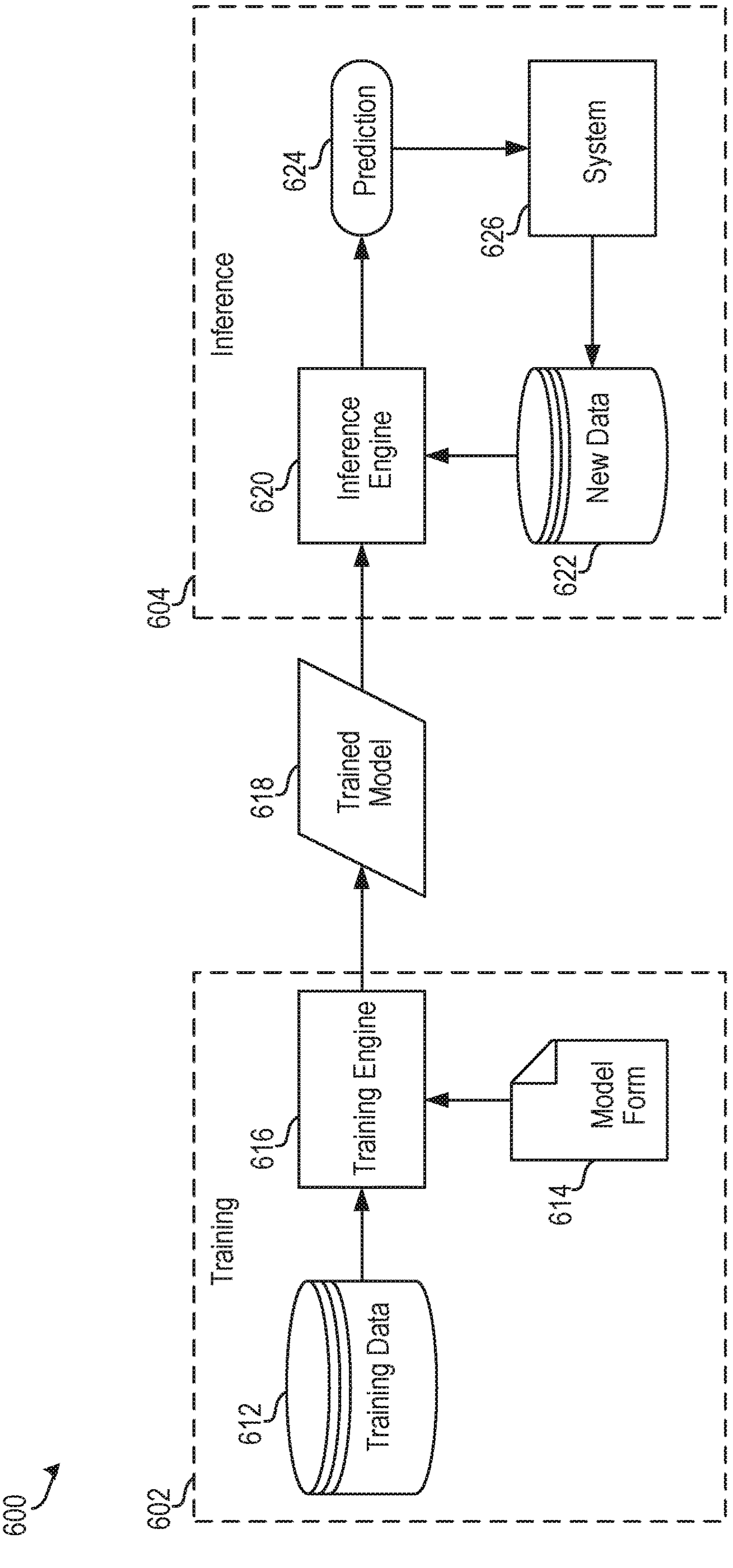
FIG. 6 is a block diagram of components of a machine learning training and inference system in accordance with one or more embodiments of the present invention.

Systems for training and using a machine learning model are now described in more detail with reference to FIG. 6. Particularly, FIG. 6 depicts a block diagram of components of a machine learning training and inference system 600 according to one or more embodiments described herein. The system 600 performs training 602 and inference 604. During training 602, a training engine 616 trains a model (e.g., the trained model 618) to perform a task, such as mitigating oscillation of a lift cable on a crane. Inference 604 is the process of implementing the trained model 618 to perform the task, such as to calculating a counter force for mitigating oscillation of a lift cable on a crane, in the context of a larger system (e.g., a system 626). All or a portion of the system 600 shown in FIG. 6 can be implemented, for example by all or a subset of the backup strategy optimization module 226 of FIG. 2, the backup strategy optimization module 226 of and/or the database profiler 316 of FIG. 3.

The training 602 begins with training data 612, which may be structured or unstructured data. According to one or more embodiments described herein, the training data 612 includes historically observed oscillation of a load being lifted by a crane, the characteristics of the load, wind conditions during the lifting of the load, and the operational characteristics of the crane. The training engine 616 receives the training data 612 and a model form 614. According to one or more embodiments described herein, the model form 614 represents a base model that is untrained. The model form 614 can have preset weights and biases, which can be adjusted during training. It should be appreciated that the model form 614 can be selected from many different model forms depending on the task to be performed. For example, where the training 602 is to train a model to perform image classification, the model form 614 may be a model form of a CNN, although other types of model forms and/or algorithms can be implemented.

According to one or more embodiments described herein, the model form 614 represents an algorithm that can be trained to perform a particular task. In some embodiments, the model form 614 is an algorithm that can include, for example, supervised learning algorithms, unsupervised learning algorithm, artificial neural network algorithms, association rule learning algorithms, hierarchical clustering algorithms, cluster analysis algorithms, outlier detection algorithms, semi-supervised learning algorithms, reinforcement learning algorithms and/or deep learning algorithms. Examples of supervised learning algorithms can include, for example, AODE; Artificial neural network, such as Backpropagation, Autoencoders, Hopfield networks, Boltzmann machines, Restricted Boltzmann Machines, and/or Spiking neural networks; Bayesian statistics, such as Bayesian network and/or Bayesian knowledge base; Case-based reasoning; Gaussian process regression; Gene expression programming; Group method of data handling (GMDH); Inductive logic programming; Instance-based learning; Lazy learning; Learning Automata; Learning Vector Quantization; Logistic Model Tree; Minimum message length (decision trees, decision graphs, etc.), such as Nearest Neighbor algorithms and/or Analogical modeling; Probably approximately correct learning (PAC) learning; Ripple down rules, a knowledge acquisition methodology; Symbolic machine learning algorithms; Support vector machines; Random Forests; Ensembles of classifiers, such as Bootstrap aggregating (bagging) and/or Boosting (meta-algorithm); Ordinal classification; Information fuzzy networks (IFN); Conditional Random Field; ANOVA; Linear classifiers, such as Fisher's linear discriminant, Linear regression, Logistic regression, Multinomial logistic regression, Naive Bayes classifier, Perceptron, and/or Support vector machines; Quadratic classifiers; k-nearest neighbor; Boosting; Decision trees, such as C4.5, Random forests, ID3, CART, SLIQ, and/or SPRINT; Bayesian networks, such as Naive Bayes; and/or Hidden Markov models. Examples of unsupervised learning algorithms can include Expectation-maximization algorithm; Vector Quantization; Generative topographic map; and/or Information bottleneck method. Examples of artificial neural network can include Self-organizing maps. Examples of association rule learning algorithms can include Apriori algorithm; Eclat algorithm; and/or FP-growth algorithm. Examples of hierarchical clustering can include Single-linkage clustering and/or Conceptual clustering. Examples of cluster analysis can include K-means algorithm; Fuzzy clustering; DBSCAN; and/or OPTICS algorithm. Examples of outlier detection can include Local Outlier Factors. Examples of semi-supervised learning algorithms can include Generative models; Low-density separation; Graph-based methods; and/or Co-training. Examples of reinforcement learning algorithms can include Temporal difference learning; Q-learning; Learning Automata; and/or SARSA. Examples of deep learning algorithms can include Deep belief networks; Deep Boltzmann machines; Deep Convolutional neural networks; Deep Recurrent neural networks; and/or Hierarchical temporal memory.

According to one or more embodiments described herein, the model form 614 is a foundational model that is trained on a wide variety of generalized, unlabeled training data to perform one or more different general tasks, such as generating content (text, images, etc.), performing natural language processing, and/or the like including combinations and/or multiples thereof. In the case of the model form 614 being a foundational model, the training 602 can include tuning the foundational model (e.g., the model form 614) using the training data 612. Tuning the foundational model provides the benefits of the broad capabilities of the foundational model while enabling the foundational model to be customized using training data (e.g., the training data 612) related to a particular task or environment to which the foundational modal is then applied. In this way, the training 602 need not train a new model from scratch, which is time consuming and resource intensive.

The training 602 can be supervised learning, semi-supervised learning, unsupervised learning, reinforcement learning, and/or the like, including combinations and/or multiples thereof. For example, supervised learning can be used to train a machine learning model to classify an object of interest in an image. To do this, the training data 612 includes labeled images, including images of the object of interest with associated labels (ground truth) and other images that do not include the object of interest with associated labels. In this example, the training engine 616 takes as input a training image from the training data 612, makes a prediction for classifying the image, and compares the prediction to the known label. The training engine 616 then adjusts weights and/or biases of the model based on results of the comparison, such as by using backpropagation. The training 602 may be performed multiple times (referred to as "epochs") until a suitable model is trained (e.g., the trained model 618).

Once trained, the trained model 618 can be used to perform inference 604 to perform a task, such as calculating a counter force for mitigating the oscillation of a lift cable on a crane. The inference engine 620 applies the trained model 618 to new data 622 (e.g., real-world, non-training data). For example, if the trained model 618 is trained to classify images of a particular object, such as a chair, the new data 622 can be an image of a chair that was not part of the training data 612. In this way, the new data 622 represents data to which the model 618 has not been exposed. The inference engine 620 makes a prediction 624 (e.g., a classification of an object in an image of the new data 622) and passes the prediction 624 to the system 626. The system 626 can, based on the prediction 624, taken an action, perform an operation, perform an analysis, and/or the like, including combinations and/or multiples thereof. In some embodiments, the system 626 can add to and/or modify the new data 622 based on the prediction 624.

In accordance with one or more embodiments, the predictions 624 generated by the inference engine 620 are periodically monitored and verified to ensure that the inference engine 620 is operating as expected. Based on the verification, additional training 602 may occur using the trained model 618 as the starting point. The additional training 602 may include all or a subset of the original training data 612 and/or new training data 612. In accordance with one or more embodiments, the training 602 includes updating the trained model 618 to account for changes in expected input data.

Various embodiments are described herein with reference to the related drawings. Alternative embodiments can be devised without departing from the scope of the present disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the present disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term “coupled” describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms “comprises,” “comprising,” “includes,” “including,” “has,” “having,” “contains” or “containing,” or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term “exemplary” is used herein to mean “serving as an example, instance or illustration. ” Any embodiment or design described herein as “exemplary” is not necessarily to be construed as preferred or advantageous over other embodiments or designs. The terms “at least one” and “one or more” are understood to include any integer number greater than or equal to one, i.e. one, two, three, four, etc. The terms “a plurality” are understood to include any integer number greater than or equal to two, i.e. two, three, four, five, etc. The term “connection” can include both an indirect “connection” and a direct “connection.”

The terms “about,” “substantially,” “approximately,” and variations thereof, are intended to include the degree of error associated with measurement of the particular quantity based upon the equipment available at the time of filing the application. For example, “about” can include a range of ±8% or 5%, or 2% of a given value.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the “C” programming language or similar programming languages. The computer readable program instructions may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for mitigating oscillation of a lift cable on a crane, the method comprising:

obtaining characteristics of a load affixed to the lift cable via a hook;

obtaining wind conditions in a location of the lift cable;

obtaining operational characteristics of the crane;

calculating an estimated oscillation of the load based on a simulation of the crane lifting the load in the wind conditions and the operational characteristics of the crane;

calculating a counter force to be applied to the lift cable via the hook, wherein the counter force comprises a lateral force in a direction that is substantially perpendicular to a vertical direction and will reduce the oscillation of the lift cable; and instructing a propulsion system affixed to the hook and configured to exert the lateral force on the hook to mitigate an oscillation or sway of the hook and the attached load to apply the counter force to the hook, wherein the propulsion system is affixed to the hook via a circular track that surrounds the hook.

2. The method of claim 1, wherein the characteristics of the load include a weight of the load, dimensions of the load, and a weight distribution of the load.

3. The method of claim 1, wherein the operational characteristics of the crane include movements of the crane, a length of the lift cable, and a stiffness of the lift cable.

4. The method of claim 1, wherein the wind conditions are obtained via an anemometer disposed on the crane.

5. The method of claim 1, wherein the propulsion system includes one or more tethered aerial vehicles that are affixed to the hook.

6. The method of claim 1, wherein the propulsion system includes one or more propellers affixed to the hook.

7. The method of claim 6, wherein the one or more propellers are slidably disposed on the circular track that surrounds the hook and wherein a location of the one or more propellers on the circular track is determined based on a direction of the counter force to be applied.

8. The method of claim 1, further comprising:

monitoring a movement of the load during application of the counter force by the propulsion system;

calculating an updated counter force based on the monitored movement; and instructing the propulsion system to apply the updated counter force.

9. The method of claim 8, wherein the movement of the load during application of the counter force by the propulsion system is monitored by a vision system affixed to the crane.

10. The method of claim 1, wherein the counter force is a force vector that includes a force magnitude and a force direction.

11. A computing system having a memory having computer readable instructions and one or more processors for executing the computer readable instructions, the computer readable instructions controlling the one or more processors to perform operations comprising:

obtaining characteristics of a load affixed to a lift cable via a hook;

obtaining wind conditions in a location of the lift cable;

obtaining operational characteristics of a crane;

calculating an estimated oscillation of the load based on a simulation of the crane lifting the load in the wind conditions and the operational characteristics of the crane;

calculating a counter force to be applied to the lift cable via the hook, wherein the counter force comprises a lateral force in a direction that is substantially perpendicular to a vertical direction and will reduce the oscillation of the lift cable; and instructing a propulsion system affixed to the hook and configured to exert the lateral force on the hook to mitigate an oscillation or sway of the hook and the attached load to apply the counter force to the hook, wherein the propulsion system is affixed to the hook via a circular track that surrounds the hook.

12. The computing system of claim 11, wherein the characteristics of the load include a weight of the load, dimensions of the load, and a weight distribution of the load.

13. The computing system of claim 11, wherein the operational characteristics of the crane include movements of the crane, a length of the lift cable, and a stiffness of the lift cable.

14. The computing system of claim 11, wherein the wind conditions are obtained via an anemometer disposed on the crane.

15. The computing system of claim 11, wherein the propulsion system includes one or more tethered aerial vehicles that are affixed to the hook.

16. The computing system of claim 11, wherein the propulsion system includes one or more propellers affixed to the hook.

17. The computing system of claim 16, wherein the one or more propellers are slidably disposed on the circular track that surrounds the hook and wherein a location of the one or more propellers on the circular track is determined based on a direction of the counter force to be applied.

18. The computing system of claim 11, wherein the operations further comprise:

monitoring a movement of the load during application of the counter force by the propulsion system;

calculating an updated counter force based on the monitored movement; and instructing the propulsion system to apply the updated counter force.

19. The computing system of claim 18, wherein the movement of the load during application of the counter force by the propulsion system is monitored by a vision system affixed to the crane.

20. A computer program product comprising a computer readable storage medium having program instructions embodied therewith, the program instructions executable by a processor to cause the processor to perform operations comprising:

obtaining characteristics of a load affixed to a lift cable via a hook;

obtaining wind conditions in a location of the lift cable;

obtaining operational characteristics of a crane;

calculating an estimated oscillation of the load based on a simulation of the crane lifting the load in the wind conditions and the operational characteristics of the crane;

calculating a counter force to be applied to the lift cable via the hook, wherein the counter force comprises a lateral force in a direction that is substantially perpendicular to a vertical direction and will reduce the oscillation of the lift cable; and instructing a propulsion system affixed to the hook and configured to exert the lateral force on the hook to mitigate an oscillation or sway of the hook and the attached load to apply the counter force to the hook, wherein the propulsion system is affixed to the hook via a circular track that surrounds the hook.

* * * * *